United States Patent [19]

Streckenbach et al.

[11] Patent Number: 5,080,278
[45] Date of Patent: Jan. 14, 1992

[54] PROCESS AND APPARATUS FOR SEALING A METALLIC CAPSULE AND WELDING IT TO A METAL CABLE

[75] Inventors: Gerd Streckenbach, Langenfeld; Wolfgang Simon, Wuppertal; Wolfgang Nuding, Troisdorf; Rainer Link, Kerpen-Horrem, all of Fed. Rep. of Germany

[73] Assignee: Isotopen-Technik Dr. Sauerwein GmbH, Haan, Fed. Rep. of Germany

[21] Appl. No.: 654,344

[22] Filed: Feb. 12, 1991

[30] Foreign Application Priority Data

May 18, 1990 [DE] Fed. Rep. of Germany ....... 4015956

[51] Int. Cl.$^5$ .................... B23K 11/04; B23K 11/14
[52] U.S. Cl. .................... 228/102; 228/189; 228/7; 228/44.3; 219/97; 219/100
[58] Field of Search .............. 228/102, 189, 7, 44.3, 228/44.5, 112; 219/97-100, 95, 125.1

[56] References Cited

U.S. PATENT DOCUMENTS

| 3,418,442 | 12/1968 | Roy | 219/100 |
| 3,524,963 | 8/1970 | Swengel | 219/100 |
| 4,704,512 | 11/1987 | Lisec | 219/97 |

Primary Examiner—Samuel M. Heinrich
Attorney, Agent, or Firm—Toren, McGeady & Associates

[57] ABSTRACT

A process and apparatus for leak-proof sealing of a metallic capsule closed by a stopper and joining the capsule to a metal cable by arc welding, wherein a capacitor is charged, the capsule with a striking tip at one end or the stopper with an ignition point and the cable are clamped at their ends, connected to the terminals of the capacitor, moved together and welded together by discharging of the capacitor with the formation of an arc.

9 Claims, 2 Drawing Sheets

PROCESS AND APPARATUS FOR SEALING A METALLIC CAPSULE AND WELDING IT TO A METAL CABLE

TECHNICAL FIELD OF THE INVENTION

The invention relates to a process and an apparatus for leak-proof sealing of a capsule closed with a stopper and joining the capsule to a metal cable by arc welding.

BACKGROUND OF THE INVENTION AND PRIOR ART

A capsule of this kind has been described, for example, in U.S. Pat. No. 4 861 520; it is filled with radioactive pellets, closed with a stopper, and the stopper is then joined to the capsule by electron beam or laser beam welding. The cable is then welded to the stopper, also using a laser beam or electron beam. Since the diameter of such radiation sources, which are used in medical technology in reloadable apparatus, is from 1 to 3 mm, it is difficult to form the welded joints so that they meet the standards in respect of resistance to breakage. For this purpose the capsule, the stopper and the cable must be brought together in holders and rotated through 360° during the welding process so that the weld bead extends right round the circumference of the capsule to give an absolutely leak-proof connection. Moreover electron beam welding must be performed in vacuum, and is therefore a lengthy and expensive process.

OBJECT OF THE INVENTION

The object of the invention is to provide a process and an apparatus for leak-proof sealing of a metallic capsule, for example filled with pellets of radioactive material, and joining the capsule to a flexible metal cable, which can be carried out in a simple and controllable manner, i.e. reproducibly, needs only a short time and leads to reduced cost.

SUMMARY OF THE INVENTION

To this end, according to the invention, in a process of the above-mentioned kind using arc welding with capacitor discharge an arc is struck between a striking tip on the capsule or on the stopper and the end of the cable and the striking tip is welded to the end of the cable. In doing this the striking tip and the end of the cable only need to be moved towards one another.

In carrying out the process, the capsule is preferably first filled with the radioactive pellets, closed by means of the stopper and pressed tight, and finally the cable is welded to the stopper and the stopper to the capsule in a single operation.

It is however also possible to weld the cable to the capsule, then fill the capsule and close it with the stopper, and finally weld the stopper to the capsule.

Yet another possibility is to fill the capsule, close it with the stopper, and to weld the stopper to the capsule and then the cable to the capsule.

In each case the welding process is performed by charging a capacitor and electrically connecting the terminals of the capacitor with the parts to be welded together. The parts to be welded are moved together, either with the voltage already applied to the two parts before the striking tip of the one part comes into contact with the other part or with the voltage of the capacitor being applied after the striking tip has contacted the other part. In either case a large current flows through the striking tip, which melts and volatilises to give a gap in which the arc is formed. The arc causes the ends of the parts to be joined together to melt and is extinguished when the ends come into contact with one another and the weld metal flows together. At this point the movement is interrupted so that the melt cools and solidifies.

To prevent oxidation of the weld metal the welding can be performed under inert gas.

It is particularly advantageous if the course of the welding process is controlled so that the parts to be welded are moved together, a timer is started as the arc is struck, the movement is controlled during the initial phase of the welding after striking of the arc so that the length of the arc remains constant as the melting proceeds, the movement is then accelerated for a short time so that the molten ends come into contact with one another, the weld metal flows together and the arc is extinguished, and the movement is interrupted until the weld bead has cooled down and the melt has solidified.

Control of the welding process in this way gives controlled and reproducible welding of the capsule to the stopper and of the stopper to the cable that meets all requirements.

The capacitor may be charged to a potential of about 40 V, while the current pulse on striking should be limited to about 250 V. Using these values controlled welding can be performed despite the small size of the parts without the radioactive pellets being adversely affected.

The apparatus according to the invention advantageously consists of a remote-controlled manipulator comprising a remote-controlled chuck for gripping the cable, connected to one terminal of the capacitor, a second, moveable, chuck for gripping the capsule, mounted coaxially with the first chuck on a carriage and connected to the other terminal of the capacitor, driving means for moving the capsule chuck and a control unit with a timer to initiate and control the welding process and the driving means.

A hood with an inert gas inlet can be arranged in the neighbourhood of the chucks.

BRIEF DESCRIPTION OF THE DRAWINGS

The invention will now be described in more detail, by way of example, with reference to some embodiments illustrated in the, accompanying drawings, in which.

DETAILED DESCRIPTION OF PREFERRED EMBODIMENTS OF THE INVENTION

Figure 1:
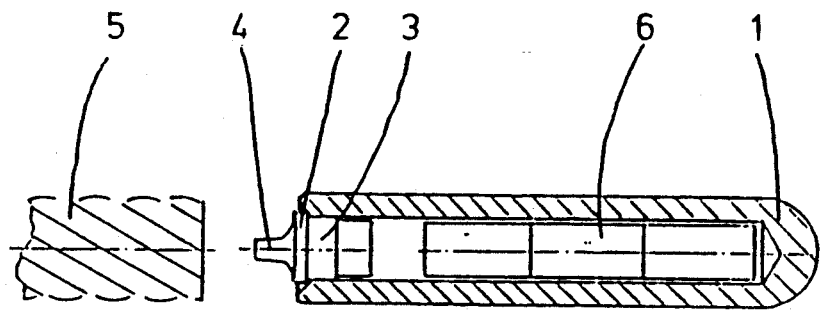
FIG. 1 shows a capsule with a stopper before welding to a cable.

The capsule 1 has a rounded, closed end and a cavity in which pellets 6 of radioactive material, for example iridium 192, are placed. The opening of the capsule 1 is closed by a stopper 2: a rebated plug portion 3 of the stopper 2 projects into the bore of the capsule 1. The plug 3 and the capsule are pressed together in order to prevent the stopper from falling out and to provide good electrical contact between the capsule 1 and the stopper 2. A striking tip 4 of the stopper 2 points towards the free end of a cable 5.

Figure 2:
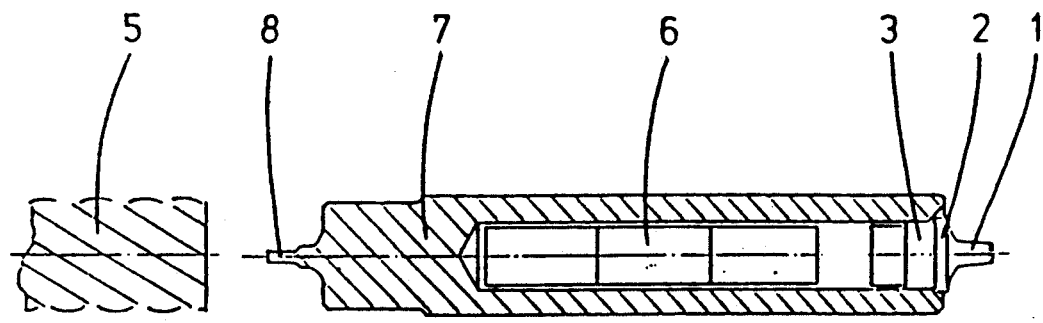
FIG. 2 shows a capsule with a stopper arranged independently of the cable.
Figure 3:
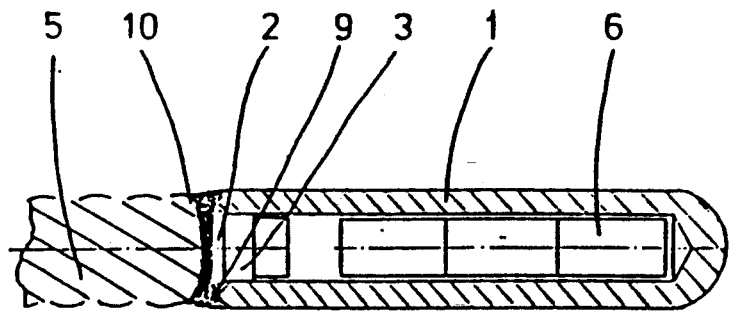
FIG. 3 shows a capsule welded to the stopper and the cable.
Figure 4:
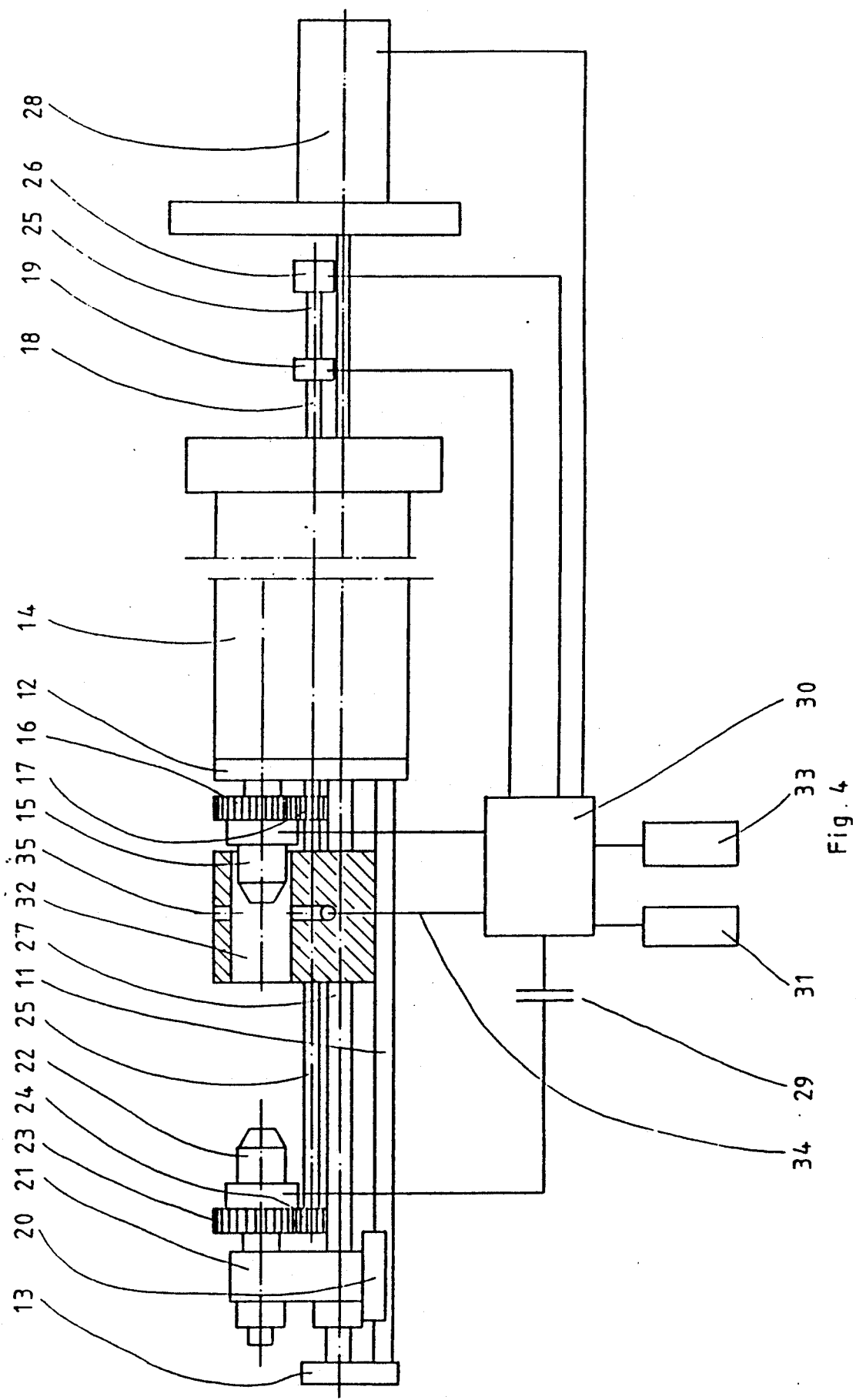
FIG. 4 shows an apparatus for carrying out the process of the invention.

In the embodiment shown in FIG. 2 the capsule 7 itself has a striking tip 8 pointing towards the cable 5 and is likewise closed by a stopper 2 and its plug 3. This stopper 2 also has a striking tip 4. In the embodiment shown in FIG. 2 the capsule 7 can either first be welded to the cable 5 and then filled with the pellets 6, closed by the stopper 2 and welded to it, or the capsule 7 is filled with the pellets 6, closed with the stopper 2 and welded to it, after which the capsule 7 is welded to the cable 5.

In the arc between the cable 5 and the stopper 2 or between the cable 25 and the stopper 7 or the capsule 7 with the stopper 2 and a corresponding counter-electrode the ends of the capsule 1, 7, of the stopper 2 and of the cable 5 melt to form a ball-like liquid zone. When the ends of the parts to be joined come into contact, the weld metal flows together as a result of the surface tension, so that after cooling and solidification a sound weld joint 9 is formed between the capsule and the stopper 2 and a weld joint between the cable and the stopper 2.

To carry out the process of the invention a welding apparatus comprising a base and a guide 11 is used. Side pieces 12 and 13 are provided at the ends of the base 11. A lead shield 14 protects the operator from the radioactive radiation emitted by the parts being welded. In the side piece 12 there is a chuck 15 which can for example receive the cable 5. Gear wheels 16, 17, a drive shaft 18 and a drive motor serve to tighten and release the chuck 15.

A carriage 20 is arranged to move along on the base 11 and comprises a carrier 21 with a chuck 22 thereon. This chuck 22 can also be released and tightened by means of gear wheels 23, 24, a drive shaft 25 and a drive motor 26. The carriage can be moved along by means of a spindle and a drive motor 28.

The terminals of a capacitor 29 are connected to the chucks 15, 22 via a control unit 30. This control unit 30 controls the drive motors 19, 26 of the chucks 15, 22 and the drive motor 28 for advancing the chuck 22 according to a preset programme. The control unit 30 is also connected to an inert gas cylinder 33 from which an inert gas line 34 leads to a hood 32 and an air removal opening 35. A timer 31 is connected to the control unit 30 so that the welding process can be performed as follows:

After the cable 5 has been inserted in the chuck 15 so that its end projects about 2 mm, and the capsule 1 with the stopper 2 has been inserted in the same way in the chuck 22, the control unit 30 is switched on by pressing a button and tightens the chucks 15, 22 by means of the drive motors 19, 26. The chuck 22 is then advanced into the hood 32 by means of the drive motor and the spindle 27 until the striking tip 4 of the stopper 2 touches the end of the cable 5. Inert gas from the cylinder 33 is then led into the hood 32 through the inert gas line 34 and displaces the air therein, which emerges through the air removal opening 35. The current is then switched on and the capacitor 29 discharged. The maximum current is limited by a series resistance. In the present case a 0.15 ohm series resistance is used, so that when a charging voltage of 40 V is used for the capacitor the current pulse on striking the arc reaches the value of 250 A. After striking, an arc plasma is formed which further limits the flow of current.

Striking the arc switches on the timer 31. During the first 75% of the welding period the chuck 22 moves towards the chuck 15 at a speed such that the length of the arc remains constant as melting proceeds. Even before the capacitor is fully discharged the movement of the chuck 22 is accelerated for a short time so that the convex liquid zones can touch the ends of the parts. The weld metal flows together and the electrical tension collapses. No more current flows, and the cooling and solidification phase begins. During this period the form of the weld bead can be influenced to some extent by adjustment of the acceleration phase and the subsequent braking phase so as not to form either a bulge as a result of pressing the parts together too hard or a neck as a result of too rapid braking.

In order to obtain a satisfactory weld joint the various parameters such as welding voltage and welding current and the speed of movement of the chuck 22 during the individual phases of the welding process must be adapted to the parts to be welded together. This can be done by programmed control by means of a microprocessor in the control unit 30.

What is claimed is:

1. A process for leak-proof sealing of a metallic capsule closed by means of a stopper and for joining it to a metal cable by arc welding, wherein an arc is struck between a striking tip on the capsule or the stopper and the end of the cable by discharge of a capacitor, and the striking tip is welded to the end of the cable.

2. A process according to claim 1 wherein the capsule is filled, closed with the stopper and pressed tight, and the cable is welded to the stopper and the stopper to the capsule in a single operation.

3. A process according to claim 1 wherein the cable is welded to one end of the capsule, the capsule is then filled from the other end and closed with the stopper, and finally the stopper is welded to the capsule.

4. A process according to claim 1, wherein the capsule is filled, closed at one end with the stopper and welded to it, and then the cable is welded to the other end of the capsule.

5. A process according to claim 1, wherein the welding is carried out in an inert gas atmosphere.

6. A process according to claim 1, wherein the parts to be welded together are moved towards one another, a timer is started as the arc is struck, the movement during the welding after striking the arc is controlled so that the arc burns uniformly, the movement is then accelerated for a short time until the molten ends come into contact, the weld metal flows together and the arc is extinguished, and the movement is interrupted until the weld bead has cooled down and the melt bead has solidified.

7. A process according to claim 6, wherein the discharge current is limited by a series resistance.

8. An apparatus for leak-proof sealing of a metallic capsule closed by means of a stopper and for joining the capsule to a metal cable by welding, comprising a remote-controlled manipulator having a first remote-controlled cable-gripping chuck connected to one terminal of a capacitor, a second movable cable-gripping chuck mounted coaxially with said first chuck on a carriage and connected to the other terminal of the capacitor, driving means for advancing said second cable chuck and a control unit comprising a timer to initiate and control the welding process and said driving means.

9. An apparatus according to claim 8 which includes a hood with an inert gas supply inlet.

* * * * *